(12) United States Patent
Shi et al.

(10) Patent No.: US 11,752,676 B1
(45) Date of Patent: Sep. 12, 2023

(54) MOLD FOR MANUFACTURING FAUCET BODY

(71) Applicant: KAIPING YIZHAN VALVE CORE CO., LTD., Guangdong (CN)

(72) Inventors: Xianbing Shi, Guangdong (CN); Junfa Shen, Guangdong (CN)

(73) Assignee: KAIPING YIZHAN VALVE CORE CO., LTD., Jiangmen (CN)

( * ) Notice: Subject to any disclaimer, the term of this patent is extended or adjusted under 35 U.S.C. 154(b) by 0 days.

(21) Appl. No.: 18/183,605

(22) Filed: Mar. 14, 2023

Related U.S. Application Data

(63) Continuation of application No. PCT/CN2022/099528, filed on Jun. 17, 2022.

(30) Foreign Application Priority Data

May 20, 2022 (CN) .......................... 202221248421.2

(51) Int. Cl.
*B29C 45/36* (2006.01)
*B29C 45/26* (2006.01)
*B29L 31/24* (2006.01)

(52) U.S. Cl.
CPC ............ *B29C 45/36* (2013.01); *B29C 45/261* (2013.01); *B29C 2045/363* (2013.01); *B29L 2031/24* (2013.01)

(58) Field of Classification Search
None
See application file for complete search history.

(56) References Cited

U.S. PATENT DOCUMENTS

2019/0226186 A1 7/2019 Park
2020/0318749 A1* 10/2020 Zhu ..................... B29C 45/2602

FOREIGN PATENT DOCUMENTS

| CN | 107631069 A | 1/2018 |
|---|---|---|
| CN | 110000358 A | 7/2019 |
| CN | 111779862 A | 10/2020 |
| CN | 215512098 U | 1/2022 |
| CN | 215849414 U | 2/2022 |
| CN | 216968403 U | 7/2022 |

OTHER PUBLICATIONS

International Search Report and Written Opinion of the International Searching Authority (WO/ISA) corresponding to counterpart International Patent Application PCT/CN2022/099528 dated Dec. 19, 2022, with English translation.

* cited by examiner

*Primary Examiner* — Armand Melendez

(74) *Attorney, Agent, or Firm* — Renner, Otto, Boisselle & Sklar, LLP

(57) ABSTRACT

A mold for manufacturing a faucet body is disclosed, including: a lower mold base; and an upper mold base forming a mold cavity. A first and second core-pulling mechanisms are slidably arranged at two ends of the lower mold base respectively, the first core-pulling mechanism is provided with a first mold core set including a valve seat mounting groove mold core, a water outlet channel mold core and a water inlet channel mold core. The valve seat mounting groove mold core and the water outlet channel mold core are fixedly arranged on one side of the first core-pulling mechanism facing the mold cavity, the water inlet channel mold core is connected with a rotating block, the other end of the rotating block is rotatably arranged on the first core-pulling mechanism. The second core-pulling mechanism is provided with a second mold core set.

8 Claims, 3 Drawing Sheets

MOLD FOR MANUFACTURING FAUCET BODY

This application is a Continuation of International Application No. PCT/CN2022/099528 filed Jun. 17, 2022, which claims priority to Chinese Application No. 202221248421.2 filed May 20, 2022, each of which is hereby incorporated herein by reference in its entirety.

TECHNICAL FIELD

The disclosure relates to the technical field of faucet body manufacturing, and particularly to a mold for manufacturing a faucet body.

BACKGROUND

Existing faucet body is generally H-shaped, and comprises left and right valve seats and a connecting part between the valve seats. A mounting groove is formed in each valve seat respectively, and may be respectively used for mounting a valve body, and the opposite valve bodies may be rotatably controlled by a handle. A central flow channel is formed in the connecting part, two ends of the central flow channel are respectively communicated with the mounting grooves in the valve seats, at least one water outlet is arranged in a middle position of the central flow channel to be communicated with the central flow channel, and the water outlet may be connected with a faucet water outlet pipe, a shower head or other water outlet components. At present, it is difficult to realize one-step molding in the process of faucet body manufacturing, and secondary encapsulation is mostly used for manufacturing and molding, resulting in the produced faucet body being easy to leak water, easy to block and short in service life.

SUMMARY

The disclosure aims to solve at least one of the technical problems in the existing technology. Therefore, the disclosure provides a mold for manufacturing a faucet body, which can realize one-step molding of faucet body, solve the problems of easy water leakage and blockage of the faucet body in the existing technology, improve product quality, and prolong service life.

A mold for manufacturing a faucet body according to an embodiment of the disclosure comprises: a lower mold base; and an upper mold base arranged on one side of the lower mold base, and the upper mold base and the lower mold base being matched to form a mold cavity; wherein, a first core-pulling mechanism and a second core-pulling mechanism are slidably arranged at two ends of the lower mold base respectively, the first core-pulling mechanism is provided with a first mold core set, the first mold core set comprises a valve seat mounting groove mold core, a water outlet channel mold core and a water inlet channel mold core, the valve seat mounting groove mold core and the water outlet channel mold core are fixedly arranged on one side of the first core-pulling mechanism facing the mold cavity, the water inlet channel mold core is connected with a rotating block, the other end of the rotating block is rotatably arranged on the first core-pulling mechanism, the rotating block is configured to, when rotating, drive the water inlet channel mold core to move, so that the water inlet channel mold core penetrates through the valve seat mounting groove mold core to enter the mold cavity and is connected with the water outlet channel mold core, the second core-pulling mechanism is provided with a second mold core set, and the second core-pulling mechanism is configured to, when sliding, enable the second mold core set to extend into the mold cavity and be connected with the valve seat mounting groove mold core.

The mold for manufacturing a faucet body according to an embodiment of the disclosure has at least the following beneficial effects. In a manufacturing process, the first core-pulling mechanism and the second core-pulling mechanism both move towards the mold cavity, so that the valve seat mounting groove mold core, the water outlet channel mold core and the second mold core set all extend into the mold cavity, and the second mold core set is connected with the valve seat mounting groove mold core. The rotating block rotates to drive the water inlet channel mold core to penetrate through the valve seat mounting groove mold core and be connected with the water outlet channel mold core. The upper mold base cooperates with the lower mold base, and is subjected to glue injection, pressure maintaining, cooling and mold opening. The upper mold base moves far away from the lower mold base, the rotating block rotates to enable the water inlet channel mold core to be pulled out of the valve seat mounting groove mold core, and then the first core-pulling mechanism and the second core-pulling mechanism both move away from the mold cavity to pull out the valve seat mounting groove mold core, the water outlet channel mold core and the second mold core set from the mold cavity, thus finishing the manufacturing of the faucet body. The mold for manufacturing a faucet body according to an embodiment of the disclosure can realize one-step molding of faucet body, solve the problems of easy water leakage and blockage of the faucet body in the existing technology, improve product quality, and prolong service life.

In the mold for manufacturing a faucet body according to an embodiment of the disclosure, the valve seat mounting groove mold core is provided with a through hole matched with the water inlet channel mold core, and the water inlet channel mold core is located in the through hole.

In the mold for manufacturing a faucet body according to an embodiment of the disclosure, the first core-pulling mechanism comprises a first fixed seat, the first fixed seat is slidably arranged on the lower mold base, and the first mold core set is arranged on the first fixed seat.

In the mold for manufacturing a faucet body according to an embodiment of the disclosure, the first fixed seat is provided with a movable cavity, and the rotating block is arranged in the movable cavity.

In the mold for manufacturing a faucet body according to an embodiment of the disclosure, the rotating block is provided with a pull rod, the pull rod is connected with a driving member, and the driving member is configured to drive the pull rod to move, so that the pull rod pulls the rotating block to rotate.

In the mold for manufacturing a faucet body according to an embodiment of the disclosure, an air cylinder is used as the driving member, and a telescopic end of the air cylinder is connected with the pull rod.

In the mold for manufacturing a faucet body according to an embodiment of the disclosure, the lower mold base is further provided with the second core-pulling mechanism, the second core-pulling mechanism is slidably arranged on one side of the lower mold base far away from the first core-pulling mechanism, the second core-pulling mechanism is provided with the second mold core set, and the second core-pulling mechanism is configured to, when sliding, enable the second mold core set to extend into or be pulled out of the mold cavity.

In the mold for manufacturing a faucet body according to an embodiment of the disclosure, the second core-pulling mechanism comprises a second fixed seat, the second fixed seat is slidably arranged on the lower mold base, and the second mold core set is arranged on the second fixed seat.

In the mold for manufacturing a faucet body according to an embodiment of the disclosure, the lower mold base is provided with a first groove and a second groove which are respectively matched with the first core-pulling mechanism and the second core-pulling mechanism, and the first core-pulling mechanism and the second core-pulling mechanism are slidably arranged in the first groove and the second groove respectively.

In the mold for manufacturing a faucet body according to an embodiment of the disclosure, the first groove and the second groove are both provided with a sliding rail, the first core-pulling mechanism and the second core-pulling mechanism are both provided with a sliding groove, and the sliding rail is matched with the sliding groove.

In the mold for manufacturing a faucet body according to an embodiment of the disclosure, each of the first core-pulling mechanism and the second core-pulling mechanism is connected with an air cylinder for driving a respective one of the first core-pulling mechanism and the second core-pulling mechanism to slide along the respective sliding rail.

The additional aspects and advantages of the disclosure will be given in part in the following description, and will become apparent in part from the following description, or will be learned through the practice of the disclosure.

BRIEF DESCRIPTION OF THE DRAWINGS

The above and/or additional aspects and advantages of the disclosure will become apparent and easy to understand from the descriptions of the embodiments with reference to the following drawings, wherein.

Figure 1:
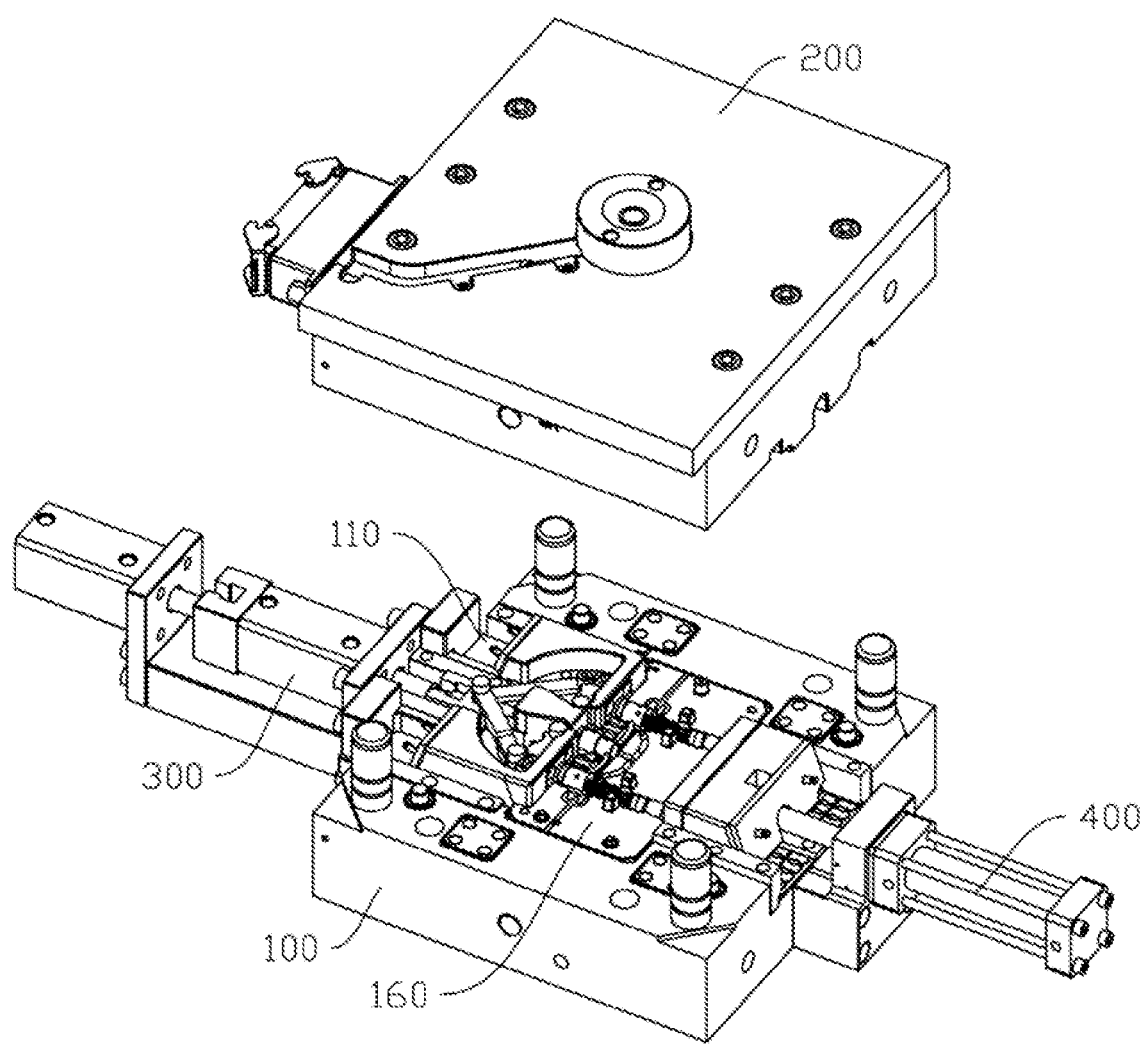
FIG. 1 is a first perspective exploded view of a mold for manufacturing a faucet body according to an embodiment of the disclosure.
Figure 2:
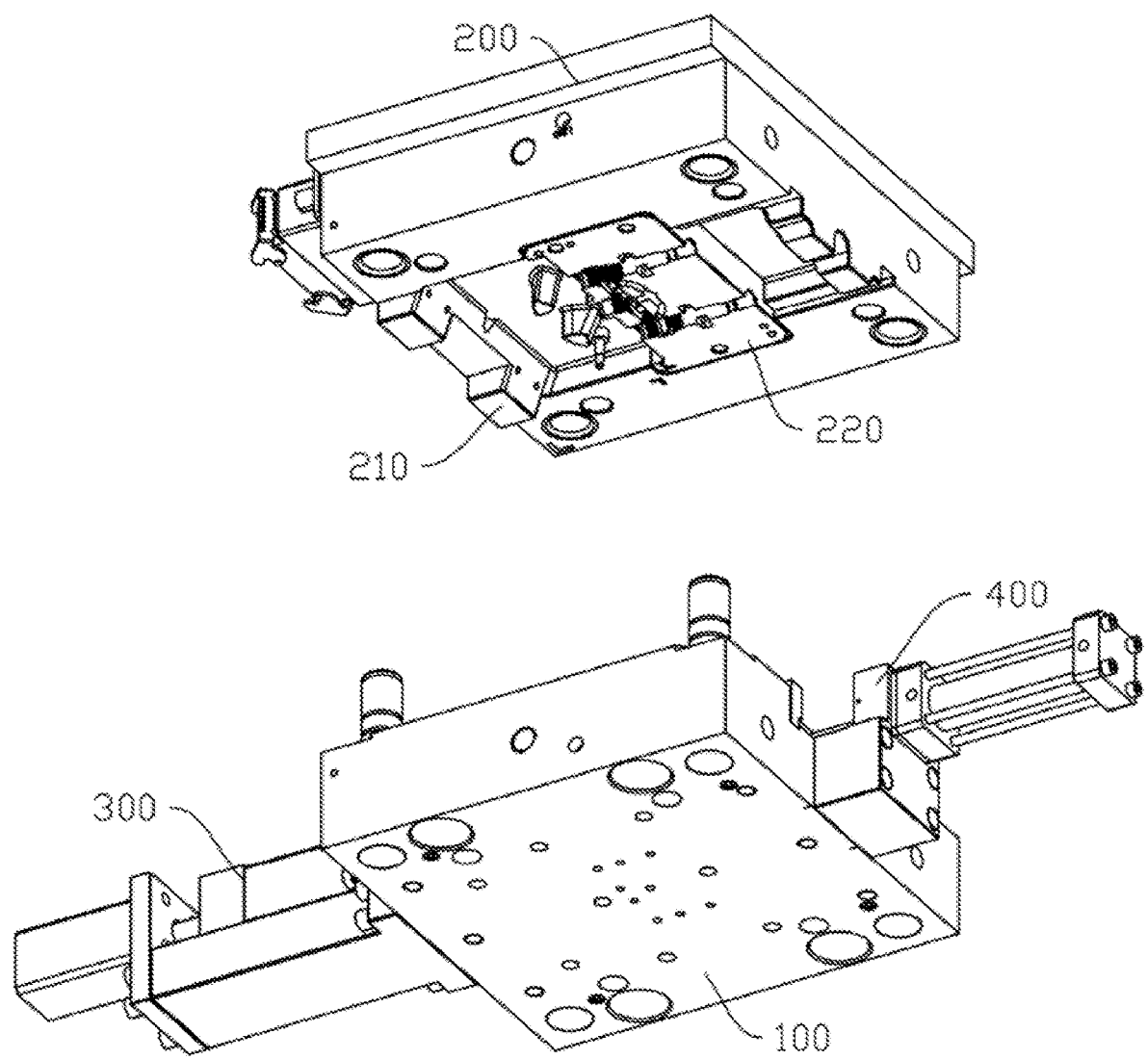
FIG. 2 is a second perspective exploded view of the mold for manufacturing a faucet body according to an embodiment of the disclosure.

Description of Reference Numerals:

100 refers to lower mold base; 110 refers to clamping groove; 120 refers to first groove; 130 refers to second groove; 140 refers to first sliding rail; 150 refers to second sliding rail; 160 refers to bottom mold; 200 refers to upper mold base; 210 refers to clamping block; 220 refers to top mold;

300 refers to first core-pulling mechanism; 310 refers to first fixed seat; 320 refers to valve seat mounting groove mold core; 330 refers to water outlet channel mold core; 340 refers to water inlet channel mold core; 350 refers to rotating block; 360 refers to movable cavity; 370 refers to pull rod; 380 refers to first air cylinder; 390 refers to second air cylinder; 400 refers to second core-pulling mechanism; 410 refers to second mold core set; 420 refers to second fixed seat; and 430 refers to third air cylinder.

DETAILED DESCRIPTION

The embodiments of the disclosure will be described in detail hereinafter. Examples of the embodiments are shown in the drawings. The same or similar reference numerals throughout the drawings denote the same or similar elements or elements having the same or similar functions. The embodiments described below with reference to the drawings are exemplary and are only intended to explain the disclosure, but should not be construed as limiting the disclosure.

In the description of the disclosure, it should be understood that the orientations or positional relationships indicated by the terms such as "upper", "lower", "front", "rear", "left", "right" and the like, refer to the orientations or positional relationships shown in the drawings, which are only intended to facilitate describing the disclosure and simplifying the description, and do not indicate or imply that the indicated devices or elements must have a specific orientation, be constructed and operated in a specific orientation, and therefore cannot be understood as a limitation of the disclosure.

In the description of the disclosure, the term "several" refers to being one or more, the term "multiple" refers to being two to more, and the terms such as "greater than", "less than", "more than" and the like are understood as not including the following number, while the terms such as "above", "below", "within" and the like are understood as including the following number. If there is the description of first and second, it is only for the purpose of distinguishing between technical features, and should not be understood as indicating or implying relative importance, implicitly indicating the number of the indicated technical features or implicitly indicating the order of the indicated technical features.

In the description of the disclosure, the terms "arrangement", "installation", "connection", and the like should be understood in broad sense unless otherwise specified and defined. The specific meaning of the above terms in the disclosure may be reasonably determined according to specific contents of the technical solutions by those of ordinary skills in the art.

With reference to FIG. 1 to FIG. 4, an embodiment of the disclosure provides a mold for manufacturing a faucet body, which comprises: a lower mold base 100; and an upper mold base 200 arranged on one side of the lower mold base 100, and the upper mold base 200 and the lower mold base 100 are matched to form a mold cavity. A first core-pulling mechanism 300 and a second core-pulling mechanism 400 are slidably arranged at two ends of the lower mold base 100 respectively.

The first core-pulling mechanism 300 is provided with a first mold core set, the first mold core set comprises a valve seat mounting groove mold core 320, a water outlet channel mold core 330 and a water inlet channel mold core 340, the valve seat mounting groove mold core 320 and the water outlet channel mold core 330 are fixedly arranged on one side of the first core-pulling mechanism 300 facing the mold cavity, the water inlet channel mold core 340 is connected with a rotating block 350, the other end of the rotating block 350 is rotatably arranged on the first core-pulling mechanism 300, the rotating block 350 rotates to drive the water inlet channel mold core 340 to move, so that the water inlet channel mold core 340 penetrates through the valve seat mounting groove mold core 320 to enter the mold cavity and is connected with the water outlet channel mold core 330. The second core-pulling mechanism 400 is provided with a second mold core set 410, and the second core-pulling mechanism 400 slides to enable the second mold core set 410 to extend into the mold cavity and be connected with the valve seat mounting groove mold core 320.

In a manufacturing process, the first core-pulling mechanism 300 and the second core-pulling mechanism 400 both move towards the mold cavity, so that the valve seat mounting groove mold core 320, the water outlet channel mold core 330 and the second mold core set 410 all extend into the mold cavity, and the second mold core set 410 is connected with the valve seat mounting groove mold core 320. The rotating block 350 rotates to drive the water inlet channel mold core 340 to penetrate through the valve seat mounting groove mold core 320 and be connected with the water outlet channel mold core 330. The upper mold base 200 cooperates with the lower mold base 100, and is subjected to glue injection, pressure maintaining, cooling and mold opening. The upper mold base 200 moves far away from the lower mold base 100, the rotating block 350 rotates to enable the water inlet channel mold core 340 to be pulled out of the valve seat mounting groove mold core 320, and then the first core-pulling mechanism 300 and the second core-pulling mechanism 400 both move away from the mold cavity to pull out the valve seat mounting groove mold core 320, the water outlet channel mold core 330 and the second mold core set 410 from the mold cavity, thus finishing the manufacturing of the faucet body. The mold for manufacturing a faucet body according to an embodiment of the disclosure can realize one-step molding of faucet body, solve the problems of easy water leakage and blockage of the faucet body in the existing technology, improve product quality, and prolong service life.

Figure 3:
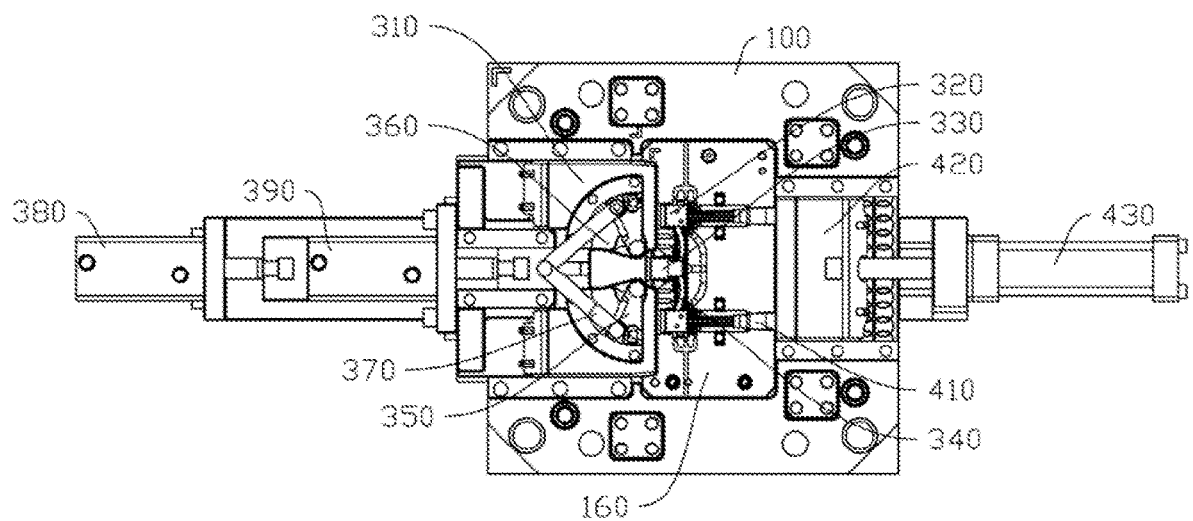
FIG. 3 is a top view of a lower mold base of the mold for manufacturing a faucet body according to an embodiment of the disclosure.
Figure 4:
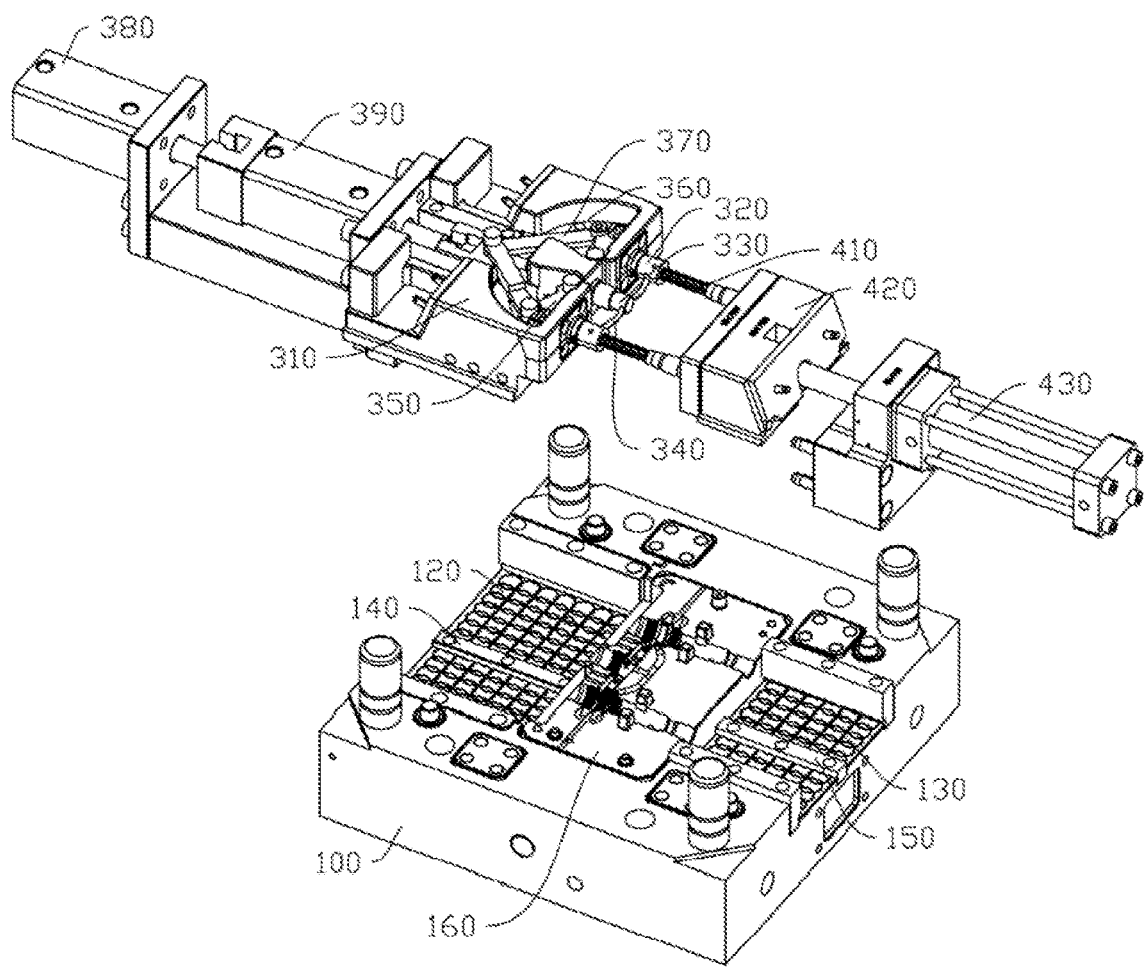
FIG. 4 is an exploded view of the lower mold base of the mold for manufacturing a faucet body according to an embodiment of the disclosure.

With reference to FIG. 3 and FIG. 4, in the embodiment, two valve seat mounting groove mold cores 320 are provided, the two valve seat mounting groove mold cores 320 are located at two ends of the first fixed seat 310, and the water outlet channel mold core 330 is arranged in a middle position between the two valve seat mounting groove mold cores 320. Two water inlet channel mold cores 340 are provided, the two water inlet channel mold cores 340 are respectively matched with the two valve seat mounting groove mold cores 320, and the water inlet channel mold core 340 may penetrate through the valve seat mounting groove mold core 320 and be connected with the water outlet channel mold core 330. The water inlet channel mold core 340 has an arc-shaped structure, the valve seat mounting groove mold core 320 is provided with an arc-shaped through hole matched with the water inlet channel mold core 340, and the water inlet channel mold core 340 may slide in the arc-shaped through hole. Specifically, the valve seat mounting groove mold core 320 has a split structure, the valve seat mounting groove mold core 320 comprises an upper part and a lower part, the upper part and the lower part are fixed to each other by welding, and the upper part and the lower part cooperatively define the arc-shaped through hole. By setting the valve seat mounting groove mold core 320 in the split structure, it is convenient to machine the arc-shaped through hole, thus realizing a simple structure and a simple operation.

With reference to FIG. 1 to FIG. 4, the lower mold base 100 is provided with a clamping groove 110, the upper mold base 200 is provided with a clamping block 210, and the clamping groove 110 and the clamping block 210 are matched, so that the lower mold base 100 and the upper mold base 200 are matched more stably. It is conceivable that the lower mold base 100 is provided with a bottom mold 160, the upper mold base 200 is provided with a top mold 220, and the bottom mold 160 and the top mold 220 are matched to form the mold cavity. Two ends of the bottom mold 160 are respectively provided with a first groove 120 and a second groove 130 which are matched with the first core-pulling mechanism 300 and the second core-pulling mechanism 400, and the first core-pulling mechanism 300 and the second core-pulling mechanism 400 are slidably arranged in the first groove 120 and the second groove 130 respectively.

The first core-pulling mechanism 300 comprises a first fixed seat 310, the first fixed seat 310 is slidably arranged in the first groove 120, and the first mold core set is arranged on the first fixed seat 310. Specifically, the first groove 120 is provided with a first sliding rail 140, the first fixed seat 310 is provided with a first sliding groove, and the first sliding groove and the first sliding rail 140 are matched, so that the first fixed seat 310 drives the first mold core set to slide along the first sliding rail 140, thus enabling the first mold core set to be pulled out of or extend into the mold cavity. It is conceivable that the first fixed seat 310 is connected with a first air cylinder 380, and the first air cylinder 380 drives the first fixed seat 310 to slide, so that the first mold core set extends into or is pulled out of the mold cavity, thus realizing a simple structure and a simple operation. Certainly, the first fixed seat 310 may also slide by using a lead screw nut or a gear and rack, and those of ordinary skills in the art may make a reasonable choice according to an actual situation, which is not limited by the disclosure.

With reference to FIG. 3 and FIG. 4, the first fixed seat 310 is provided with a movable cavity 360, the rotating block 350 is arranged in the movable cavity 360, and the rotating block 350 rotates in the movable cavity 360, thus driving the water inlet channel mold core 340 to move. By arranging the rotating block 350 in the movable cavity 360, the structure can be reasonable and compact, and meanwhile, it is ensured that the water inlet channel mold core 340 can penetrate through the valve seat mounting groove mold core 320 to enter the mold cavity, so that the water inlet channel mold core 340 is connected with the water outlet channel mold core 330. It is easy to understand that the rotating block 350 is provided with a pull rod 370, and the pull rod 370 is connected with a driving member. The driving member drives the pull rod 370 to move, so that the pull rod 370 pulls the rotating block 350 to rotate, and then the water inlet channel mold core 340 is pulled out of or extends into the mold cavity, thus realizing a simple structure and a simple operation. The driving member is a second air cylinder 390, and the second air cylinder 390 drives two water inlet channel mold cores 340 to move at the same time, so that the two water inlet channel mold cores 340 can be pulled out of or extend into mold cavity at the same time, thus ensuring synchronization, while reducing costs at the same time. Certainly, a plurality of driving members may also be provided, and each pull rod 370 is separately driven by one driving member, which is not limited by the disclosure.

The second core-pulling mechanism 400 comprises a second fixed seat 420, the second fixed seat 420 is slidably arranged in the second groove 130, and the second mold core set 410 is arranged on the second fixed seat 420. The second fixed seat 420 slides to drive the second mold core set 410 to move, so that the second mold core set 410 extends into the mold cavity and is connected with the valve seat mounting groove mold core 320. It is conceivable that the second groove 130 is provided with a second sliding rail 150, the second fixed seat 420 is provided with a second sliding groove matched with the second sliding rail 150, and the second sliding rail 150 is matched with the second sliding groove to make the second fixed seat 420 slide more stably. It is easy to understand that the second fixed seat 420 is connected with a third air cylinder 430, and the third air cylinder 430 drives the second fixed seat 420 to slide, so that the second mold core set 410 extends into or is pulled out of the mold cavity, thus realizing a simple structure and stable working. It should be noted that the second fixed seat 420 may also slide by using a lead screw nut or a gear and rack, which is not limited by the disclosure.

Firstly, a copper pipe is placed in a corresponding position in the mold cavity. Then, the valve seat mounting groove mold core 320 and the water outlet channel mold core 330 are fixed on the first fixed seat 310, the second mold core set 410 is fixed on the second fixed seat 420, and the first air cylinder 380 and the third air cylinder 430 respectively drive the first fixed seat 310 and the second fixed seat 420 to move towards the bottom mold 160, so that the valve seat mounting groove mold core 320, the water outlet channel mold core 330 and the second mold core set 410 extend into the mold cavity, and the second mold core set 410 penetrates through the copper pipe and is connected with the valve seat mounting groove mold core 320. Next, the second air cylinder 390 drives the pull rod 370 to move, to drive the rotating block 350 to rotate, so that the water inlet channel mold core 340 penetrates through the valve seat mounting groove mold core and is connected with the water outlet channel mold core 330. The upper mold base 200 cooperates with the lower mold base 100, and is subjected to glue injection, pressure maintaining, cooling and mold opening. At the moment, the faucet body and the copper pipe are subjected to one-step integrated injection molding in an embedded manner, and a middle waterway is also formed. Finally, the second air cylinder 390 drives the pull rod 370 to move, so as to drive the rotating block 350 to rotate, so that the water inlet channel mold core 340 is pulled out of the valve seat mounting groove mold core 320, and the first air cylinder 380 and the third air cylinder 430 respectively drive the first fixed seat 310 and the second fixed seat 420 to move away from the bottom mold 160, thus pulling out the valve seat mounting groove mold core 320, the water outlet channel mold core 330 and the second mold core set 410 from the mold cavity, and taking out a finished product. The above structure can realize one-step molding of faucet body, solve the problems of easy water leakage and blockage of the faucet body in the existing technology, improve product quality, and prolong service life.

In the descriptions of the specification, the descriptions with reference to the terms "one embodiment", "some embodiments", "illustrative embodiment", "example", "specific example" or "some examples", etc., refer to that specific features, structures, materials, or characteristics described with reference to the embodiments or examples are included in at least one embodiment or example of the disclosure. In the specification, the schematic representation of the above terms does not necessarily mean the same embodiment or example. Moreover, the specific features, structures, materials or characteristics described may be combined in any one or more embodiments or examples in a suitable manner.

Although the embodiments of the disclosure have been shown and described, those of ordinary skills in the art should understand that various changes, amendments, substitutions and modifications can be made to these embodiments without departing from the principles and purposes of the disclosure, and the scope of the disclosure is defined by the claims and equivalents thereof.

What is claimed is:

1. A mold for manufacturing a faucet body, comprising: a lower mold base; and an upper mold base arranged on one side of the lower mold base, and
    the upper mold base and the lower mold base being matched to form a mold cavity;
    wherein, a first core-pulling mechanism and a second core-pulling mechanism are slidably arranged at two ends of the lower mold base respectively, the first core-pulling mechanism is provided with a first mold core set, the first mold core set comprises a valve seat mounting groove mold core, a water outlet channel mold core and a water inlet channel mold core, the valve seat mounting groove mold core and the water outlet channel mold core are fixedly arranged on one side of the first core-pulling mechanism facing the mold cavity, the water inlet channel mold core is connected with a rotating block, the other end of the rotating block is rotatably arranged on the first core-pulling mechanism, the rotating block is configured to, when rotating, drive the water inlet channel mold core to move, so that the water inlet channel mold core penetrates through the valve seat mounting groove mold core to enter the mold cavity and is connected with the water outlet channel mold core, the second core-pulling mechanism is provided with a second mold core set, and the second core-pulling mechanism is configured to, when sliding, enable the second mold core set to extend into the mold cavity and be connected with the valve seat mounting groove mold core;
    wherein the first core pulling mechanism comprises a first fixed seat provided with a movable cavity, the first fixed seat is slidably arranged on the lower mold base, the first mold core set is arranged on the first fixed seat, and the rotating block is arranged in the movable cavity.

2. The mold for manufacturing a faucet body of claim 1, wherein the valve seat mounting groove mold core is provided with a through hole matched with the water inlet channel mold core, and the water inlet channel mold core is located in the through hole.

3. The mold for manufacturing a faucet body of claim 1, wherein the rotating block is provided with a pull rod, the pull rod is connected with a driving member, and the driving member is configured to drive the pull rod to move, so that the pull rod pulls the rotating block to rotate.

4. The mold for manufacturing a faucet body of claim 3, wherein an air cylinder is used as the driving member, and a telescopic end of the air cylinder is connected with the pull rod.

5. The mold for manufacturing a faucet body of claim 1, wherein the second core-pulling mechanism comprises a second fixed seat, the second fixed seat is slidably arranged on the lower mold base, and the second mold core set is arranged on the second fixed seat.

6. The mold for manufacturing a faucet body of claim 1, wherein the lower mold base is provided with a first groove and a second groove which are respectively matched with the first core-pulling mechanism and the second core-pulling mechanism, and the first core-pulling mechanism and the second core-pulling mechanism are slidably arranged in the first groove and the second groove respectively.

7. The mold for manufacturing a faucet body of claim 6, wherein the first groove and the second groove are both provided with a sliding rail, the first core-pulling mechanism and the second core-pulling mechanism are provided with a sliding groove, and the sliding rail is matched with the sliding groove.

8. The mold for manufacturing a faucet body of claim 7, wherein each of the first core-pulling mechanism and the second core-pulling mechanism is connected with an air cylinder for driving a respective one of the first core-pulling mechanism and the second core-pulling mechanism to slide along the respective sliding rail.

* * * * *